Patented Mar. 10, 1936

2,033,351

UNITED STATES PATENT OFFICE

2,033,351

PROCESS OF MANUFACTURE OF PAPER

Harry Huet Nelson, Paris, and Guillaume Becker, Asnieres, France

No Drawing. Application July 13, 1934, Serial No. 735,090. In France July 19, 1933

5 Claims. (Cl. 92—21)

The present invention is concerned with a method of sizing and waterproofing paper, cardboard, etc. in the course of manufacture of the paper.

According to these improvements, there is added to the pulp bath contained in the pulping machine a fresh but uniform solution of cellulose sulfocarbonate which has been manufactured in such a way that its viscosity is as high as possible.

From this solution there is then precipitated hydrated cellulose in a form soluble on the fibres by adding a dilute acid, for example ten times the weight of the cellulose to be precipitated of a solution containing ⅕th gramme-molecule of sulphur dioxide and ⅕th gramme-molecule of sodium bisulphite per litre.

It has been found that the substance thus precipitated is constituted by pure hydrated cellulose but the aggregates of which are electrically discharged, and that this substance is thixotropic, that is to say that it has the property of being converted from the sol to the gel state, of reliquefying if said gel be agitated and so on, and that such thixotropy is all the more marked as the cellulose aggregates are more hydrated, and the viscosity of the sulfocarbonic solution used in its preparation is higher.

It has a characteristic green colour and becomes sky-blue when subjected to prolonged dialysis.

It is evident that any acid may be used provided that said acid is added in just sufficient quantity to cause the aggregates to discharge and is sufficiently diluted to overcome its dehydrating influence. Acids such as acetic, sulphurous, hypochlorous, hydrochloric, sulphuric acid may be used alone or in combination.

The roughly equimolecular mixture of sulphurous acid and alkaline bisulphite enables the desired object to be easily achieved, and the bivalent ion of sulphur to be removed simultaneously without release of sulphurous hydrogen and separation of sulphur. This mixture may be obtained in any manner outside of or within the solution of cellulose sulfocarbonate.

The drying operation dehydrates the colloid by destroying its solubility. It goes without saying that such stabilization might likewise be obtained by the action of an acid or another dehydrating agent, such as alcohol, formol or tannin.

Another way of carrying out the process consists in forming the thixotrope apart, using a pasty solution of cellulose sulfocarbonate suitably diluted before the coagulant is added. After manufacture, this product is in a practically neutral state and may be added without difficulty to any pulp stock whether chemical or mechanical, if desired, after dialysis, to rid said product of any saline impurities.

The change of surroundings causes the thixotrope to jellify rapidly and the gel is deposited on the fibres according to the law of Hans Muller, even without addition of a precipitant. Precipitation may be facilitated if the pH of the treatment waters be raised to 5.8 by addition of acids or substances having an acid reaction as for example aluminium sulfate. Sizing with cellulose may be combined with sizing with resin or paraffin.

The products obtained constitute translucent webs which are repellant to water and fatty substances (oil, petroleum, etc.), and the mechanical strength of which is considerably increased.

The webs may be made supple in the course of or after manufacture with the help of soap, glycerine or glucose, and these supplying agents may be incorporated in the thixotrope before its preparation. They may be washed to rid them of the slight quantity of impurities (sodium, hyposulphite) which they contain.

A waterproof paper web obtained according to the invention may be applied to advantage before drying on a paper or cardboard web, using for example, a multiple table paper machine. A waterproof board is thus obtained.

We claim:

1. Process of sizing and impregnating cellulose material, consisting in mixing with the cellulosic pulp cellulose thixotrope formed by treating a fresh and highly viscous solution of cellulose sulfocarbonate with an acid solution consisting of a mixture of sulphurous acid and alkaline bisulphite in the requisite proportions to avoid release of sulphurous hydrogen and separation of the sulphur, such acid solution being added in just sufficient quantity to electrically discharge the aggregates of the colloid.

2. Process according to claim 1, consisting in dehydrating the cellulosic material thus impregnated with cellulose thixotrope.

3. Process according to claim 1, consisting in dehydrating the cellulosic material thus impregnated with cellulose thixotrope, and treating it with a suppling agent.

4. Process according to claim 1, wherein when paper is the cellulosic material treated, the paper web formed is applied by couching on a sheet of paper or cardboard.

5. Process of sizing and impregnating cellulosic materials, consisting in mixing with the cellulosic pulp cellulose thixotrope formed by treating a fresh and highly viscous solution of cellulose sulphocarbonate with an acid solution consisting in a mixture of sulphurous acid and alkaline bisulphite in substantially equimolecular proportions.

HARRY HUET NELSON.
GUILLAUME BECKER.